United States Patent [19]

Hard et al.

[11] 4,397,826

[45] Aug. 9, 1983

[54] METHOD OF PRODUCING PHOSPHORUS PENTOXIDE IN A KILN WITH REDUCED CARBON BURNOUT

[75] Inventors: Robert A. Hard, Laguna Beach; Jacob J. Mu, Santa Ana, both of Calif.

[73] Assignee: Occidental Research Corporation, Irvine, Calif.

[21] Appl. No.: 376,799

[22] Filed: May 10, 1982

[51] Int. Cl.³ .............................................. C01B 25/12
[52] U.S. Cl. .................................... 423/304; 423/318; 423/322; 423/323
[58] Field of Search ................ 423/304, 318, 322, 323; 44/10 H

[56] References Cited

U.S. PATENT DOCUMENTS

| | | | |
|---|---|---|---|
| 1,655,981 | 1/1928 | Barr | 423/318 |
| 3,235,330 | 2/1966 | Lapple | 423/304 |
| 3,241,917 | 3/1966 | Lapple | 423/304 |

FOREIGN PATENT DOCUMENTS 1300911 8/1969 Fed. Rep. of Germany ........ 423/32

OTHER PUBLICATIONS

Megy et al, Ser. No. 265,307, filed May 20, 1981.

*Primary Examiner*—Gregory A. Heller
*Attorney, Agent, or Firm*—Walter A. Hackler

[57] ABSTRACT

A process for producing phosphorus pentoxide from phosphate ore includes the steps of mixing phosphate ore containing silica with solid carbonaceous material and a silica fluxing agent to form a feed mixture and thereafter forming the feed mixture into pellets. Alternatively, pellets may be formed using phosphate ore containing silica and carbonaceous material which are then coated with a silica fluxing agent. The pellets are heated by exposure to radiation eminating from an oxidation zone within a kiln to a temperature enabling the silica fluxing agent to promote melting of the silica proximate to surface areas of the pellet in order to seal internal portions of the pellet from the oxidizing zone and thereby reduce premature oxidation of the carbonaceous material in the pellet. Thereafter the pellets are heated to a temperature sufficient to reduce the phosphate in the pellets by reaction with the solid carbonaceous material to form elemental phosphorus vapor. Sufficient oxygen-containing gas is introduced into the kiln to cause oxidation of the elemental phosphorus vapor within the oxidation zone to produce phosphorus pentoxide.

13 Claims, 5 Drawing Figures

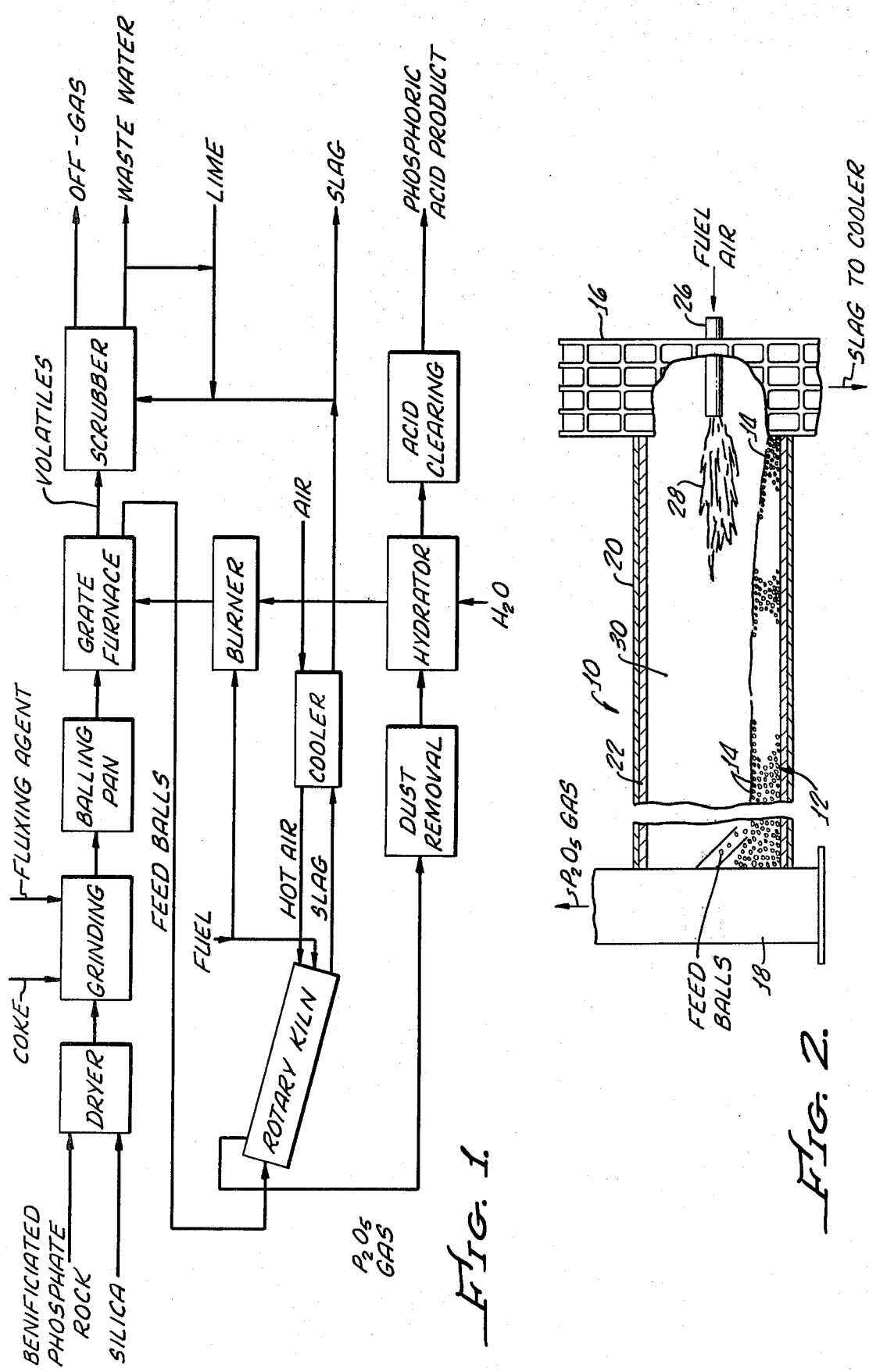

METHOD OF PRODUCING PHOSPHORUS PENTOXIDE IN A KILN WITH REDUCED CARBON BURNOUT

The present invention pertains generally to the reduction of phosphate ores in a rotary-type kiln, and more particularly is directed to a method of limiting carbon burnout, or oxidation, which may occur during the reduction process.

Generally, in a kiln process for producing phosphorus pentoxide, a reaction bed comprised of fluorapatite ore, carbonaceous material and silica is heated to reductively extract elemental phosphorus which is evolved from a reaction between carbon and the phosphate ore. The elemental phosphorus is then burned over the reaction bed to produce phosphorus pentoxide and provide a portion of the endothermic heat necessary for the reduction reaction.

A significant problem occurring with the kiln phosphate ore reduction process is the premature oxidation of the carbon (carbon burnout) by the oxidizing atmosphere disposed over the reaction bed within the kiln. Such carbon burnout significantly affects the yield of the kiln phosphate ore process because, when oxidized, the carbon is no longer available as a reducing agent for the phosphate ore.

A number of attempts have been made to decrease the amount of carbon burnout. Lapple, in U.S. Pat. No. 3,241,917, added separate, or "free", coke to a reaction bed of compacted pellets, comprising phosphate ore, silica and carbon, in order to surround the compacted pellets and prevent oxygen, present in the oxidizing atmosphere over the bed, from reacting with the carbon in the pellets while the reaction bed passed through a rotary-type kiln.

While deterring carbon burnout, the addition of free coke to the reaction bed may not be effective because tumbling of the reaction bed and the free coke within the rotary kiln, causes the free coke to separate from the particles, thereby exposing the particles to the oxidizing atmosphere.

Another attempt (co-assigned U.S. patent application Ser. No. 265,307 to Megy et al. now U.S. Pat. No. 4,351,813) was to purge the reaction bed with an inert gas in order to establish a flow of gas, including carbon monoxide produced by the reduction reaction, toward the surface of the reaction bed to form a layer of inert gas and carbon monoxide over the bed, thus preventing contact of the reaction bed with the oxidizing atmosphere. While this procedure significantly reduces carbon burnout, extensive modification of the kiln to provide for ports therein to introduce a purging gas beneath the bed while the rotary kiln is turned is not only expensive but requires increased maintenance costs.

The present invention provides a method for reducing the carbon burnout in kiln reduction of phosphate ore and thereby enhancing the yield of the process.

SUMMARY OF THE INVENTION

The present invention is directed to a process for producing phosphorus pentoxide from phosphate ore in which the yield of phosphorus pentoxide is increased by reducing carbon oxidation within the feed materials and comprises the steps of mixing phosphate ore containing silica with solid carbonaceous material and a silica fluxing agent to form a feed mixture, forming the feed mixture into pellets, and thereafter heating the pellets by exposure to radiation emanating from an oxidation zone within a kiln to a temperature enabling the silica fluxing agent to promote melting of the silica proximate to the surface of the pellets to reduce oxidation of the carbonaceous material in the pellet by at least partially sealing the pellet interior portions from the oxidation zone. Thereafter, the pellets are heated to a temperature sufficient to reduce the phosphate in the pellets by reaction with the solid carbonaceous material to form elemental phosphorus vapor. Sufficient oxygen containing gas is introduced into the kiln to cause oxidation of the elemental phosphorus vapor within the oxidation zone to produce phosphorus pentoxide and to heat the pellet.

Alternatively, the feed mixture may not include the silica fluxing agent, and the pellets may be coated with the silica fluxing agent prior to heating of the pellets.

More particularly, the phosphate ore containing silica is mixed with solid carbonaceous material and phosphoric acid to form a feed mixture having a phosphoric acid content of about 0.4 to about 1.0 percent by weight before introduction to a rotary-type kiln. The phosphoric acid decomposes to phosphorus pentoxide at temperatures greater than about 1100° C. and the phosphorus pentoxide acts as a fluxing agent for the silica in the balls. The feed mixture is co-ground so that 50 to 85 percent of the co-ground feed mixture passes a $-325$ mesh before forming the co-ground feed pellet into pellets.

Thereafter, the pellets are heated to 1100° C. as they are exposed to an oxidation zone within the rotary-type kiln to decompose the phosphoric acid to phosphorus pentoxide and thereby promote melting of the silica to seal off the pellet interior portions.

BRIEF DESCRIPTION OF THE DRAWINGS

The advantages and features of the present invention will be better understood by the following description and drawings in which:

FIG. 1 is a block diagram of a kiln process for the production of phosphoric acid showing a kiln for the production of phosphorus pentoxide and associated process apparatus;

FIG. 2 is a diagram of a rotary-type kiln for carrying out the process of the present invention;

DETAILED DESCRIPTION

Figure 3:
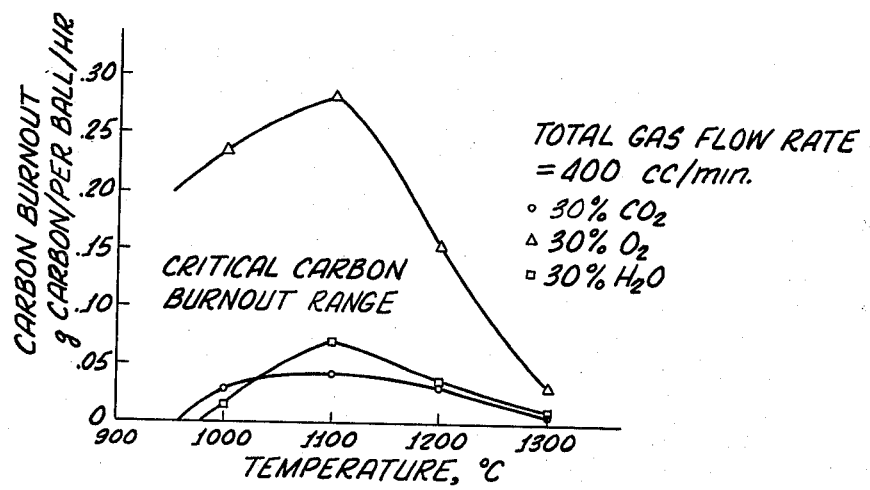
FIG. 3 is a plot showing percent of carbon burnout as a function of temperature for feed pellets showing the effect of the type of oxidizing atmosphere and the temperature range where most carbon burnout occurs.

Turning now to FIG. 1, there is generally shown, in block diagram form, a kiln process for the production of phosphoric acid. The following description of the general process is provided as background information to provide a better understanding of the present invention.

In general, the reductive extraction of phosphorus from the beneficiated ore is the result of the reaction between phosphate ore, such as fluorapatite, solid carbonaceous material such as coke or coal, and silica, namely, $Ca_{10}(PO_4)_6F_2 + carbon + silica + 12,700 BTU$ (per lb of phosphorus) → phosphorus gas + carbon monoxide + calcium silicate, these reactants should be held in close proximity to each other during the course of the reaction at the proper relative concentration of each reactant. Hence, it is preferred that the feed materials be agglomerated, or compacted, into pellets. This agglomeration also reduces dust within the kiln and reduces clinker formation which may occur if small individual particles of a loose feed material of ore silica and coke were fed into the rotary kiln.

Feed pellets are prepared by drying the phosphate ore and silica, grinding the beneficiated phosphate ore, silica, and coke, either together or separately, and forming the mixture into generally spherical balls with a conventional balling pan, which are then fed to a grate furnace to drive off any volatile materials contained therein.

As shown in FIG. 1, gases driven off of the grate furnace are passed for elimination from the system and the preheated feed balls are fed into a rotary kiln 10. Solid residue, or slag, is removed from the rotary kiln and passed through a cooler for cooling the residue and simultaneously heating input air for the rotary kiln 10. Product gas, or vapor, $P_2O_5$, is removed from the rotary kiln and passed through a dust removal stage and a hydrater to form phosphoric acid and thereafter cleaned to produce a product phosphoric acid as is well known in the art.

In accordance with the present invention a fluxing agent for silica is added to the feed mixture, conveniently during the grinding of the feed. Alternatively, the fluxing agent may be added to the surface of the pellets after their formation in the balling pan, together with additional silica. Additional silica, preferably in the form of silica flour, may be added to the surface of the pellets to promote sealing of the pellets, upon heating, by melting of the added silica which is promoted by the coating of silica fluxing agent.

FIG. 2 more particularly illustrates a rotary-type kiln 10 for carrying out the process of the present invention. While a number of different types of kilns may be used, the rotary kiln is particularly suited for the reduction of phosphate ores because of its efficiency in transferring heat directly to a bed 12 consisting of compacted pellets, 14 as hereinabove described. The rotary-type kiln may be of conventional design, having stationary end portions 16, 18, and a rotating center section, or cylinder 20 interconnected therewith lined with a suitable refractory 22, mechanism for rotating the cylinder 20 not being shown in FIG. 2.

Fuel and air, or oxygen, are fed to a burner 26 which produces a flame 28 for directly heating the bed 12.

For start-up, a conventional fuel may be used to preheat the kiln center portion 20 and the bed 12, but as the reaction in the bed produces elemental phosphorus vapor and carbon monoxide which are burned in an oxidation zone 30, less fuel is required. Sufficient air or oxygen must be provided, however, to oxidize the phosphorus and the carbon monoxide above the bed in the oxidation zone 30 for heating the bed by radiation therefrom.

The present invention is particularly directed to a process for the reduction of phosphate ores such as fluorapatite ($Ca_{10}(PO_4)_6F_2$), the reduction reaction being generalized as:

$Ca_{10}(PO_4)_6F_2 + 15C + 9XSiO_2 \rightarrow 15CO + 3/2P_4 + 9[CaOXSiO_2] + CaF_2$, where $0 \leq x \leq 5$.

In the process of concern of this invention, however, the exposure of the pellets 14 to the oxidation zone 30 causes carbon in the pellets to oxidize, thus preventing the reaction between carbon and $Ca_{10}(PO_4)_6F_2$ and limiting the yield of the process.

While some blanketing or protection of the bed 12 from the oxidizing atmosphere 30 is provided by carbon monoxide gas evolved from the reduction reaction which may collect over the bed 12, such protection has not been found to significantly reduce carbon burnout.

It has been experimentally found that the addition of a silica fluxing agent which seals the surface areas of the pellets when heated, does significantly reduce the amount of carbon oxidation or burnout. Examples of fluxing agents useful for this purpose are phosphoric acid, boric acid and sodium borate.

It should be appreciated that the sealing of the pellets should occur at temperatures where the carbon reacts with oxygen to form carbon monoxide, namely 700° to 1200° C. and preferably 900°–1100° C. On the other hand, such a seal cannot be permanent or impervious to the passage of $P_2O_5$ as it is generated within the pellet at higher temperatures, namely above about 1200° C.

The use of phosphoric acid as a fluxing agent was experimentally determined as follows:

Ground Florida matrix ore (($CaO/SiO_2)_M = 0.33$) was mixed with the calcined petroleum coke (($C/P_2O_5)_M = 10$), and water. Binders, such as lignosulfonates, may also be added to the feed mixture. The feed formulation is shown in Table 1.

After thorough blending of the prewetted charge, it was transferred to a 1-meter diameter balling pan which had a 15-centimeter lip. The pan was operated at a solid feed rate of 300–500 pounds per hour to produce balls of about 15–16% final moisture content. Another batch of balls was made by using 3–5% phosphoric acid solution as a binder in the balling process. The same final moisture content of 15–16% was achieved. The balls from each batch at a nominal ½ inch diameter were used for carbon burnout test in a Thermogravimetric Analyzer (TGA).

TABLE 1

| KPA FEED FORMULATION | |
|---|---|
| | wt. % |
| CaO | 15.5 |
| $P_2O_5$ | 12.52 |
| $SiO_2$ | 51.0 |
| C | 10.06 |
| Impurities | 10.38 |

The thermogravimetric analyzer (TGA), not shown, consists of an electronic balance, a closed furnace, temperature control, gas mixing system, sample boat, and a recording system. The analyzer, which is typical of those well known in the art, measures the weight of a material and its rate of change continuously, either as a function of increasing temperature or preselected temperature over a period of time. The gas mixing system, not shown, includes a flow meter and means for passing nitrogen gas, carbon monoxide, or a mixture thereof, past ore ball samples, not shown, to regulate the partial pressure of carbon monoxide surrounding the ore ball samples while they are heated within the closed furnace.

Figure 4:
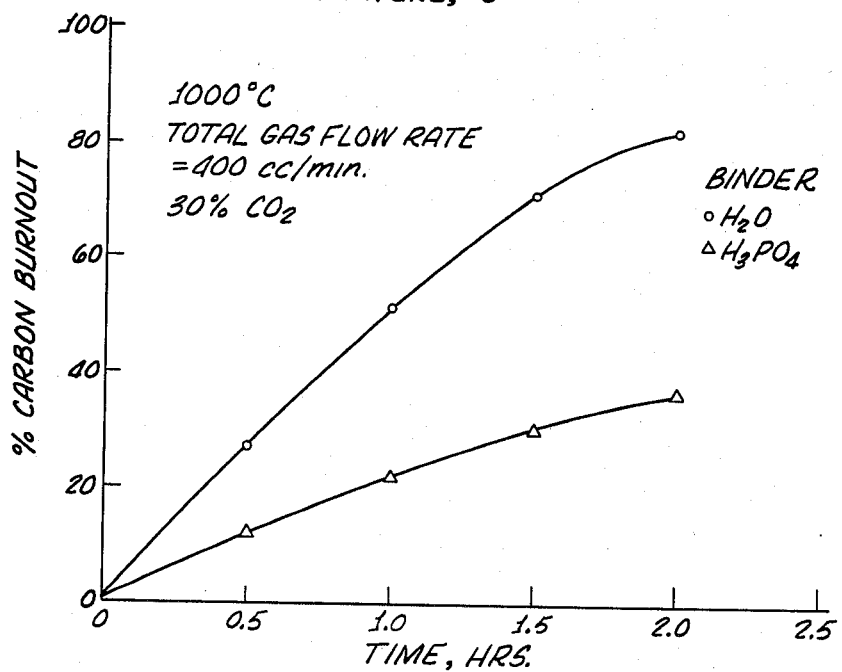
FIG. 4 is a plot showing percent of carbon burnout as a function of time for feed pellets at approximately 1000° C. showing the effect of a silica fluxing agent on carbon burnout; and, FIG. 5 is a plot showing percent of carbon burnout as a function of time for feed pellets at approximately 1100° C. showing the effect of a silica fluxing agent on carbon burnout.
Figure 5:
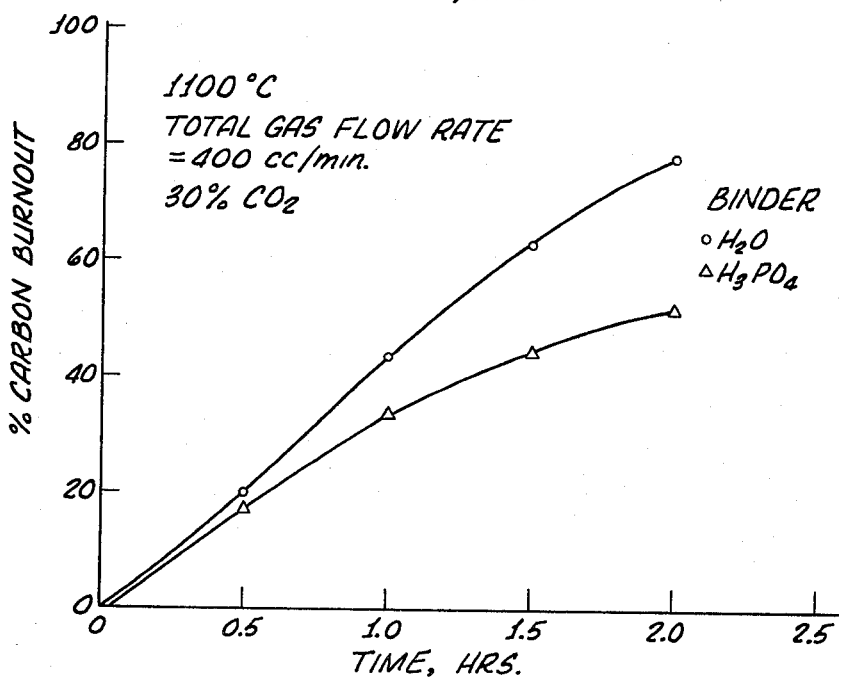

The results of these experiments are shown in FIGS. 3, 4 and 5. In FIG. 3 the percent of carbon burnout, or oxidation is plotted as a function of temperature, and shows the critical temperature range where carbon oxidation most readily occur, namely about 950° C. to about 1500° C.

FIGS. 4 and 5 show the effect of the addition of about 0.4 to about 1.0 percent phosphoric acid to the feed mixture, before pelletization, at temperatures of 1000° and 1100° C. respectively.

Phosphoric acid decomposes in the temperature range of 700°–1100° C. to $P_2O_5$ which promotes sintering, or melting, of the silica proximate surfaces areas of the pellet to thereby reduce oxidation of the carbon, or carbonaceous material, in the pellet by at least partially sealing the pellet interior portions from the oxidation zone 30. After heating to this sintering temperature, continued heating of the pellet occurs on the pellet pass through the rotary kiln at a rate of about 3° to about 5° C. per minute. At the reaction temperature of over about 1200° C. between the carbon and the phosphate ore, the $P_2O_5$ proximate the surface of the pellets is driven off leaving a porous surface which enables the reaction product, elemental phosphorus to escape the pellet and enter the oxidation zone where it is thereafter oxidized to $P_2O_5$.

Although there has been described hereinabove a specific process for reducing phosphate ore in accordance with the invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A process for producing phosphorus pentoxide from phosphate ore comprising the steps of:
   mixing phosphate ore containing silica with solid carbonaceous material and a silica fluxing agent to form a feed mixture;
   forming the feed mixture into pellets;
   heating the pellets by exposure to radiation emanating from an oxidation zone within a kiln to a temperature enabling the silica fluxing agent to promote melting of the silica proximate to surface areas of the pellets to reduce oxidation of the carbonaceous material in the pellet by at least partially sealing pellet interior portions from the oxidation zone, and thereafter continuing to heat the pellets to a temperature sufficient to reduce the phosphate in the pellets by reaction with the solid carbonaceous material to form elemental phosphorus vapors; and
   introducing into the kiln sufficient oxygen-containing gas to cause oxidation of the elemental phosphorus vapor within the oxidation zone to produce phosphorus pentoxide and to heat the pellets.

2. A process for producing phosphorus pentoxide from phosphate ore comprising the steps of:
   mixing phosphate ore containing silica with solid carbonaceous material to form a feed mixture;
   forming the feed mixture into pellets;
   coating the pellets with a silica fluxing agent;
   heating the coated pellets by exposure to radiation emanating from an oxidation zone within a kiln to a temperature enabling the silica fluxing agent to promote melting of the silica proximate to surface areas of the coated pellets to reduce oxidation of the carbonaceous material in the coated pellet by at least partially sealing coated pellet interior portions from the oxidation zone, and thereafter continuing to heat the pellets to a temperature sufficient to reduce the phosphate in the coated pellets by reaction with the solid carbonaceous material to form elemental phosphorus vapors; and
   introducing into the kiln sufficient oxygen-containing gas to cause oxidation of the elemental phosphorus vapor within the oxidation zone to produce phosphorus pentoxide and to heat the coated pellets.

3. A process for producing phosphorus pentoxide from phosphate ore comprising the steps of:
   mixing phosphate ore containing silica with solid carbonaceous material and a silica fluxing agent to form a feed mixture;
   forming the feed mixture into pellets;
   coating the pellets with a mixture comprising silica and a silica fluxing agent;
   heating the coated pellets by exposure to radiation emanating from an oxidation zone within a kiln to a temperature enabling the silica fluxing agent to promote melting of the silica proximate to surface areas of the coated pellets to reduce oxidation of the carbonaceous material in the coated pellet by at least partially sealing coated pellet interior portions from the oxidation zone, and thereafter continuing to heat the pellets to a temperature sufficient to reduce the phosphate in the coated pellets by reaction with the solid carbonaceous material to form elemental phosphorus vapors; and
   introducing into the kiln sufficient oxygen-containing gas to cause oxidation of the elemental phosphorus vapor within the oxidation zone to produce phosphorus pentoxide and to heat the coated pellets.

4. A process for producing phosphorous pentoxide from phosphate ore comprising the steps of:
   mixing phosphate ore containing silica with solid carbonaceous material and a silica fluxing agent to form a feed mixture;
   forming the feed mixture into pellets;
   heating the pellets by exposure to radiation emanating from an oxidation zone within a rotary-type kiln to a temperature enabling the silica fluxing agent to promote melting of the silica proximate to surface areas of the pellets to reduce oxidation of the carbonaceous material in the pellet by at least partially sealing pellet interior portions from the oxidation zone, and thereafter continuing to heat the pellets to a temperature sufficient to reduce the phosphate in the pellets by reaction with the solid carbonaceous material to form elemental phosphorus vapors; and
   introducing into the rotary-type kiln sufficient oxygen-containing gas to cause oxidation of the elemental phosphorus vapor within the oxidation zone to produce phosphorus pentoxide and to heat the pellets.

5. The process of claim 1, 2, 3 or 4 wherein the silica fluxing agent is selected from the group consisting of phosphoric acid, boric acid and sodium borate.

6. The process of claim 1 or 4 wherein the silica fluxing agent is added in an amount to produce a feed mixture having a silica fluxing agent content of about 0.4 to about 1.0 percent by weight.

7. A process for producing phosphorus pentoxide from phosphate ore comprising the steps of:
mixing phosphate ore containing silica solid carbonaceous material and a silica fluxing agent to form a feed mixture;
co-grinding the phosphate ore feed mixture so that 50 to 85 percent of the co-ground feed mixture passes a −325 mesh;
forming the co-ground feed mixture into pellets;
heating the pellets by exposure to radiation emanating from an oxidation zone within a rotary-type kiln to a temperature enabling the silica fluxing agent to promote melting of the silica proximate to surface areas of the pellets to reduce oxidation of the carbonaceous material in the pellet by at least partially sealing pellet interior portions from the oxidation zone, and thereafter continuing to heat the pellets to a temperature sufficient to reduce the phosphate in the pellets by reaction with the solid carbonaceous material to form elemental phosphorus vapor; and
introducing into the rotary-type kiln sufficient oxygen-containing gas to cause oxidation of the elemental phosphorus vapor within the oxidation zone to produce phosphorus pentoxide and to heat the pellets.

8. A process for producing phosphorus pentoxide from phosphorus ore comprising the steps of:
mixing phosphate ore containing silica with solid carbonaceous material and phosphoric acid in amounts to produce a feed mixture having a phosphoric acid content of about 0.4 to about 1.0 percent by weight;
co-grinding the feed mixture so that 50 to 85 percent of the co-ground feed mixture passes a −325 mesh;
forming the co-ground feed mixture into pellets;
heating the pellets by exposure to radiation emanating from an oxidation zone within a rotary-type kiln to a temperature enabling the silica fluxing agent to promote melting of the silica proximate to surface areas of the pellets to reduce oxidation of the carbonaceous material in the pellet by at least partially sealing pellet interior portions from the oxidation zone, and thereafter continuing to heat the pellets to a temperature sufficient to reduce the phosphate in the pellets by reaction with the solid carbonaceous material to form elemental phosphorus vapors, said heating of the pellets being at a rate of approximately 3° to approximately 5° C. per minute; and
introducing into the rotary-type kiln sufficient oxygen-containing gas to cause oxidation of the elemental phosphorus vapor within the oxidation zone to produce phosphorus pentoxide and to heat the pellets.

9. A process for producing phosphorus pentoxide from phosphate ore comprising the steps of:
mixing phosphate ore containing silica with solid carbonaceous material and a silica fluxing agent to form a feed mixture, said fluxing agent promoting said silica to sinter in the temperature range of 700° C. to 1100° C.;
forming the feed mixture into pellets;
heating the pellets by exposure to radiation emanating from an oxidation zone within a rotary-type kiln to 1100° C. enabling the silica proximate to surface areas of the pellets to reduce oxidation of the carbonaceous material in the pellet by at least partially sealing pellet interior portions from the oxidation zone, and thereafter continuing to heat the pellets to a temperature sufficient to reduce the phosphate in the pellets by reaction with the solid carbonaceous material to form elemental phosphorus vapors; and
introducing into the rotary-type kiln sufficient oxygen-containing gas to cause oxidation of the elemental phosphorus vapor within the oxidation zone to produce phosphorus pentoxide and to heat the pellets.

10. A process for producing phosphorus pentoxide from phosphate ore comprising the steps of:
mixing phosphate ore containing silica with solid carbonaceous material and a silica fluxing agent to form a feed mixture, said fluxing agent promoting said silica to melt in the temperature range of 700° C. to 1100° C., said fluxing agent vaporizing at temperatures greater than about 1100° C.;
forming the feed mixture into pellets;
heating the pellets by exposure to radiation emanating from an oxidation zone within a rotary-type kiln to a 1100° C. enabling to the silica fluxing agent to promote melting of the silica proximate to surface areas of the pellets to reduce oxidation of the carbonaceous material in the pellet by at least partially sealing pellet interior portions from the oxidation zone, and thereafter continuing to heat the pellets to at least 1300° C. to reduce the phosphate in the pellets by reaction with the solid carbonaceous material to form elemental phosphorus vapor and vaporize the fluxing agent from the surface areas of the pellet to enable the elemental phosphorus vapors to escape the pellets and enter the oxidation zone; and
introducing into the rotary-type kiln sufficient oxygen-containing gas to cause oxidation of the elemental phosphorus vapor within the oxidation zone to produce phosphorus pentoxide and to heat the pellets.

11. A process for producing phosphorus pentoxide from phosphate ore comprising the steps of:
mixing phosphate ore containing silica with solid carbonaceous material and phosphoric acid to form a feed mixture having a phosphoric acid content of about 0.4 to about 1.0 percent by weight, phosphoric acid decomposing to phosphorus pentoxide at temperatures greater than about 1100° C.;
co-grinding the feed mixture so that 50 to 85 percent of the co-ground feed mixture passes a −325 mesh;
forming the co-ground feed mixture into pellets;
heating the pellets by exposure to radiation emanating from an oxidation zone within a rotary-type kiln to a 1100° C. enabling the phosphorus pentoxide to promote melting of the silica proximate to surface areas of the pellets to reduce oxidation of the carbonaceous material in the pellet by at least partially sealing pellet interior portions from the oxidation zone, and thereafter continuing to heat the pellets to at least 1300° C. to reduce the phosphate in the pellets by reaction with the solid carbonaceous material to form elemental phosphorus vapor and drive the phosphorus pentoxide from the surface areas of the pellet to enable the elemental phosphorus vapors to escape the pellets and enter the oxidation zone; and
introducing into the rotary-type kiln sufficient oxygen-containing gas to cause oxidation of the elemental phosphorus vapor within the oxidation zone to produce phosphorus pentoxide and to heat the pellets.

12. A process for producing phosphorus pentoxide from phosphate ore comprising the steps of:

mixing phosphate ore containing silica with solid carbonaceous material to form a feed mixture;

forming the feed mixture into pellets;

coating the pellets with a silica fluxing agent, said fluxing agent promoting said silica to melt in the temperature range of 700° C. to 1100° C., said fluxing agent vaporizing at temperatures greater than about 1100° C.;

heating the pellets by exposure to radiation emanating from an oxidation zone within a rotary-type kiln to a 1100° C. enabling to the silica fluxing agent to promote melting of the silica proximate to surface areas of the pellets to reduce oxidation of the carbonaceous material in the pellet by at least partially sealing pellet interior portions from the oxidation zone, and thereafter continuing to heat the pellets to at least 1300° C. to reduce the phosphate in the pellets by reaction with the solid carbonaceous material to form elemental phosphorus vapor and vaporize the fluxing agent from the surface areas of the pellet to enable the elemental phosphorus vapors to escape the pellets and enter the oxidation zone; and introducing into the rotary-type kiln sufficient oxygen-containing gas to cause oxidation of the elemental phosphorus vapor within the oxidation zone to produce phosphorus pentoxide and to heat the pellets.

13. The process of claim 12 wherein the silica fluxing agent comprises phosphoric acid.

* * * * *